L. F. McNALLY.
TRAP DOOR LOCK.
APPLICATION FILED DEC. 21, 1916.
1,217,197.
Patented Feb. 27, 1917.
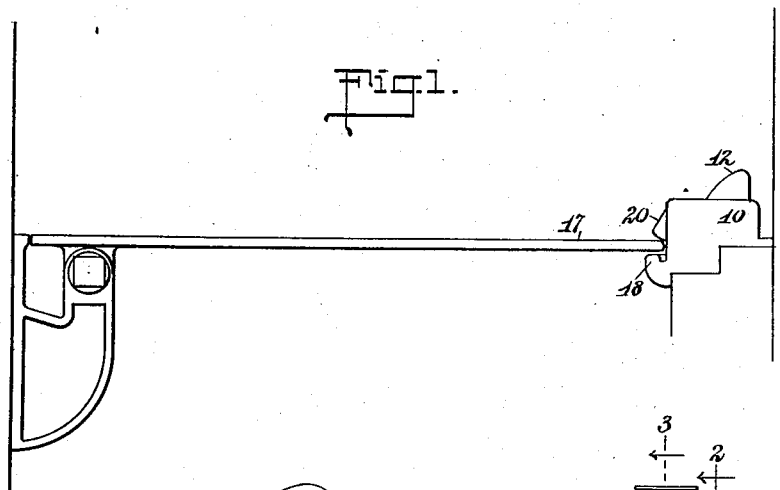
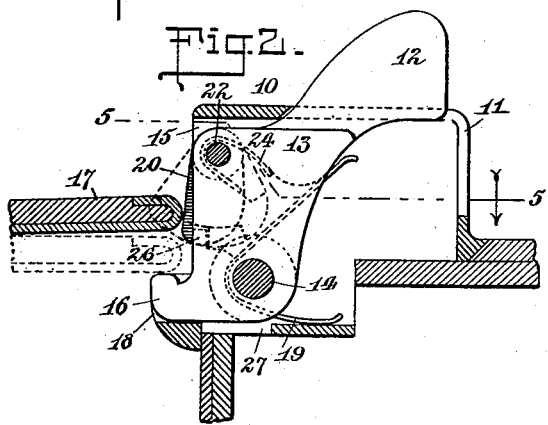
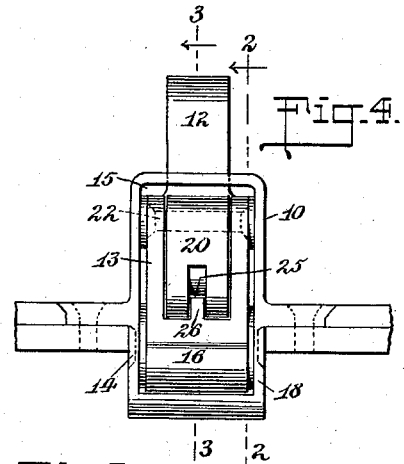
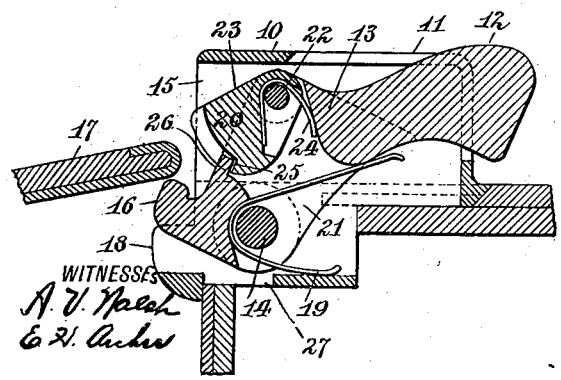
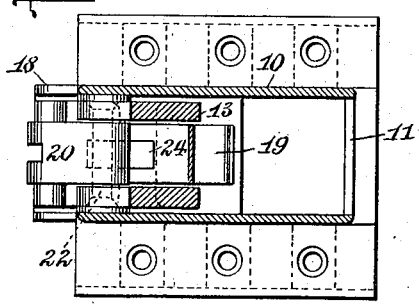
INVENTOR
Leo F. McNally.
BY
George Cook & Sons
ATTORNEYS

UNITED STATES PATENT OFFICE.

LEO F. McNALLY, OF BROOKLYN, NEW YORK, ASSIGNOR TO DAVID W. PYE, OF RED BANK, NEW JERSEY.

TRAP-DOOR LOCK.

1,217,197. Specification of Letters Patent. Patented Feb. 27, 1917.

Application filed December 21, 1916. Serial No. 138,147.

*To all whom it may concern:*

Be it known that I, LEO F. MCNALLY, a citizen of the United States, and a resident of New York, borough of Brooklyn, in the county of Kings and State of New York, have made and invented certain new and useful Improvements in Trap-Door Locks, of which the following is a specification.

My invention relates to a lock for use in connection with trap doors of vestibule cars, and particularly to that type of lock in which the locking and opening mechanism is mounted so as to swing or move about a single center or pivot, and in so doing release, and impart an initial upward movement to the trap door.

In this type of mechanism as previously constructed, considerable difficulty was experienced, owing to the fact that it was necessary for the entire locking and opening mechanism to be rotated about its pivotal support in order to allow the trap door to pass beneath the latch portion thereof. Furthermore, the pivotal mounting of the locking and opening mechanism being situated at the level of, or below, the trap door, and the beveled face of the latch being located above the said pivotal mounting and protruding over the vertical center thereof, required that, in order for the latch to be forcibly moved out of the path of the trap door, the latch would necessarily describe an upward path or arc. The blow of the trap door upon the latch being downward, considerable friction was brought to bear upon the beveled face of the latch, and undue and destructive forces impressed upon the pivotal mounting of the locking and opening mechanism.

It is therefore an object of my invention to provide a lock wherein the locking and opening mechanism is adapted to be rotated about a common center for releasing and opening the trap door, and at the same time so formed that the latch portion may move independent of the remaining portions of the locking and opening mechanism. A further object is to provide a lock for a trap door in which the latch which is carried by the oscillating mechanism is pivotally secured thereto, the location of the pivot being such that the latch moves downward and rearward as it is retracted, which action takes place in a smooth and readily-performed manner upon being struck by the edge of the trap door as the latter is closed.

Other objects and advantages will appear as the description proceeds, wherein it is to be understood that changes in the precise embodiment of the invention can be made within the scope of what is claimed without departing from the spirit thereof.

The preferred embodiment of my invention is illustrated in the accompanying drawings, wherein:

Figure 1 is a view in side elevation, of a trap door and adjacent portions of the car platform, equipped with my improved trap door lock;

Fig. 2 is a view in vertical section taken on the line 2—2 of Fig. 4, illustrating the manner in which the latch is forced rearwardly as the trap door passes therebeneath;

Fig. 3 is a view in vertical section taken on the line 3—3 of Fig. 4, illustrating the locking and opening mechanism, in a canted position, releasing the trap door and imparting the initial upward movement thereto;

Fig. 4 is a view in front elevation of my improved trap door lock;

Fig. 5 is a view in horizontal section taken on the line 5—5 of Fig. 2.

Referring specifically to the several views, the casing 10, of general box-shape form, is provided at its upper extremity with a slot 11, through which extends the foot-engageable portion 12 of a locking and opening mechanism 13. The locking and opening mechanism is mounted for pivotal movement upon a pin 14 located at, or slightly below, the general level of the trap door 17 with which my improved lock coöperates. Projecting forwardly from the lower portion of the locking and opening mechanism, and in front of the pivotal pin 14, upon which the same is mounted, is a striking arm 16. In order that the weight of the trap door will not be carried by the striking arm, and that the lock may be properly positioned with respect to the platform, the casing is provided with upstanding and forwardly projecting side members 18, which are positioned in the general plane of the edge of the platform upon which the trap door rests when in a closed position. A resilient member or spring 19 engages the locking and opening mechanism and adjacent portions of the casing, extends around the pivotal pin 14, and maintains the locking and opening mechanism normally in an upright position with the striking arm located immediately below the lower surface of the trap door.

A latch 20 is hingedly secured to, and operates within a groove 21 in, the oscillating mechanism. In order that the retraction of the latch may take place in a downward and inward manner, the hinged mounting of the latch is accomplished by means of a pivotal pin 22 located at the top and adjacent the forward edge of the oscillating mechanism, and considerably above the general level of the trap door when the latter is closed. The latch is provided with the blunt beveled face 23, capable of long wear, and is so positioned that it extends in the path of movement of the trap door, and when projecting thereabove securely locks the trap door in its closed position. The latch, being hinged about its upper extremity, the retraction thereof takes place in a smooth and unhampered manner, and although the direction of the force caused by the striking of the trap door upon the latch is such that it extends approximately through the center of the main pivotal pin 14, there is but little stress or strain brought to bear thereon. A resilient member or spring 24 is contained within the groove 21 and engages the side walls of the locking and opening mechanism and adjacent wall of the latch, having first passed around the pivotal pin 22. This spring resiliently holds the latch in its forwardly projecting position. A stop 26 which travels within a groove 25 located in the bottom of the latch, limits the outward movement thereof.

In order to prevent the accumulation of dirt or foreign material within the casing, it is provided with openings 27, whereby the locking and opening mechanism may move, as a unitary structure, about the pivotal pin 14, in an unobstructed manner. In use, as the trap door is forcibly closed, it strikes the beveled protruding face of the latch and forces the same rearwardly, the remaining parts of the locking and opening mechanism remaining stationary. After the trap door has passed beneath the latch, the latter springs to its original position and holds the trap door closed and locked. At such time as it is desired to release and open the trap door, the foot-engageable portion 12 of the locking mechanism is forced downwardly, either by a direct pressure of the foot thereon, or by a glancing blow, either of which causes the locking and opening mechanism, in its entirety, to move rearwardly about the pivotal pin 14, which movement withdraws the latch from above the door and forcibly raises the same by the upward pressure of the striking arm against the lower surface of the trap door.

What I claim is:—

1. A trap door lock comprising a pivotally mounted locking and opening mechanism adapted to move about said pivotal mounting as a unitary structure, said locking and opening mechanism including a striking arm and a latch, and means whereby said latch may move rearwardly independent of said locking and opening mechanism.

2. A trap door lock comprising a pivotally mounted locking and opening mechanism, said mechanism adapted to move about said pivotal mounting as a unitary structure, said locking and opening mechanism including a forwardly projecting striking arm adapted to raise the trap door, and a pivotally mounted latch arranged in the path of motion of the trap door.

3. A trap door lock and opener comprising a casing, a member pivotally mounted therein and provided with a foot-engageable portion projecting therefrom, a striking arm carried by said member adapted to raise the trap door, and a latch carried by said member extending into the path of motion of the trap door and pivotally secured at its upper extremity to said member.

4. A trap door lock and opener comprising a casing, a locking and opening mechanism pivotally mounted therein and including a main member, a foot-engageable portion carried by said main member and extending through an opening in said casing, a striking arm carried by said main member and adapted to raise a trap door, a latch pivotally secured at its upper extremity to said main member, said main member, latch, striking arm and foot-engageable portion, adapted to oscillate about the pivotal mounting of the main member as a unitary structure.

5. A trap door lock and opener comprising a casing, a locking and opening mechanism pivotally mounted therein and including a main member, a foot-engageable portion carried by said main member and extending through an opening in said casing, a striking arm carried by said main member and adapted to raise a trap door, a latch pivotally secured at its upper extremity to said main member, said main member, latch, striking arm and foot-engageable portion, adapted to oscillate about the pivotal mounting of the main member as a unitary structure, and resilient means engaging said main member and said casing, adapted to hold said locking mechanism in upright operative position.

6. A trap door lock and opener comprising a casing, a locking and opening mechanism pivotally mounted therein and including a main member, a foot-engageable portion carried by said main member and extending through an opening in said casing, a striking arm carried by said main member and adapted to raise a trap door, a latch pivotally secured at its upper extremity to said main member, said main member, latch, striking arm and foot-engageable portion, adapted to oscillate about the pivotal mounting of the main member as a unitary structure, resilient means engaging said main member and said casing, adapted to hold said locking mechanism in upright operative position, and resilient means engaging said latch and said main member, holding said latch in a forwardly extending and protruding position.

7. A trap door lock and opener comprising a casing, a locking and opening mechanism pivotally mounted therein and including a main member, a foot-engageable portion carried by said main member and extending through an opening in said casing, a striking arm carried by said main member and adapted to raise a trap door, a latch pivotally secured at its upper extremity to said main member, said main member, latch, striking arm and foot-engageable portion, adapted to oscillate about the pivotal mounting of the main member as a unitary structure, said latch and main member provided with coöperating parts limiting the outward pivotal movement of said latch.

8. A trap door lock and opener comprising a casing, a locking and opening mechanism pivotally mounted therein and including a main member, a foot-engageable portion carried by said main member and extending through an opening in said casing, a striking arm carried by said main member and adapted to raise a trap door, a latch pivotally secured at its upper extremity to said main member, said main member, latch, striking arm and foot-engageable portion, adapted to oscillate about the pivotal mounting of the main member as a unitary structure, said latch provided with a groove extending along its under surface, said main member provided with a stop traveling in the groove of the latch and limiting the pivotal motion of the latter.

9. A trap door lock and opener comprising a casing, a locking and opening mechanism pivotally mounted therein and including a main member, a foot-engageable portion carried by said main member and extending through an opening in said casing, a striking arm carried by said main member and adapted to raise a trap door, a latch pivotally secured at its upper extremity to said main member, said main member, latch, striking arm and foot-engageable portion, adapted to oscillate about the pivotal mounting of the main member as a unitary structure, said latch provided with a groove extending along its under surface, said main member provided with a stop traveling in the groove of the latch and limiting the pivotal motion of the latter, and resilient means for maintaining said main member and said latch in upright positions.

10. A trap door lock and opener comprising a casing, a locking and opening mechanism pivotally mounted therein and including a main member, a foot-engageable portion carried by said main member and extending through an opening in said casing, a striking arm carried by said main member and adapted to raise a trap door, a latch pivotally secured at its upper extremity to said main member, said main member, latch, striking arm and foot-engageable portion, adapted to oscillate about the pivotal mounting of the main member as a unitary structure, the front of said casing provided with forwardly-projecting upstanding sides terminating at a height approximately equal to the height of the striking arm when the same is in its normal and operative position.

Signed at New York, borough of Manhattan, in the county of New York and State of New York, this 20th day of December A. D. 1916.

LEO F. McNALLY.

Witnesses:
A. M. LINDENSTRUTH,
ANNA V. WALSH.

Copies of this patent may be obtained for five cents each, by addressing the "Commissioner of Patents, Washington, D. C."